(12) United States Patent
Ojha et al.

(10) Patent No.: US 11,893,001 B2
(45) Date of Patent: Feb. 6, 2024

(54) SYSTEMS AND METHODS FOR STORING BLEND OBJECTS

(71) Applicant: MicroStrategy Incorporated, Tysons Corner, VA (US)

(72) Inventors: Ananya Ojha, Dunn Loring, VA (US); Hani Soewandi, Potomac, MD (US)

(73) Assignee: MICROSTRATEGY INCORPORATED, Tysons Corner (VA)

(*) Notice: Subject to any disclaimer, the term of this patent is extended or adjusted under 35 U.S.C. 154(b) by 0 days.

(21) Appl. No.: 17/460,878

(22) Filed: Aug. 30, 2021

(65) Prior Publication Data

US 2022/0092052 A1    Mar. 24, 2022

Related U.S. Application Data

(60) Provisional application No. 63/081,224, filed on Sep. 21, 2020.

(51) Int. Cl.
*G06F 7/00* (2006.01)
*G06F 17/00* (2019.01)
*G06F 16/23* (2019.01)
*G06F 21/31* (2013.01)

(52) U.S. Cl.
CPC ...... *G06F 16/2358* (2019.01); *G06F 16/2308* (2019.01); *G06F 16/2365* (2019.01); *G06F 21/31* (2013.01); *G06F 2221/2141* (2013.01)

(58) Field of Classification Search
None
See application file for complete search history.

(56) References Cited

U.S. PATENT DOCUMENTS

| | | | |
|---|---|---|---|
| 2017/0220633 A1* | 8/2017 | Porath | G06F 16/248 |
| 2018/0089328 A1* | 3/2018 | Bath | G06F 16/22 |
| 2020/0050607 A1* | 2/2020 | Pal | G06F 16/24545 |
| 2020/0117658 A1* | 4/2020 | Venkata | G06F 16/248 |
| 2020/0320130 A1* | 10/2020 | Korpman | G06F 16/8373 |
| 2021/0182309 A1* | 6/2021 | Qiu | G06F 16/9535 |
| 2021/0342125 A1* | 11/2021 | Burnett | G06F 16/252 |

* cited by examiner

*Primary Examiner* — Tuan A Pham
(74) *Attorney, Agent, or Firm* — Bookoff McAndrews, PLLC

(57) ABSTRACT

A computer-implemented method for creating standalone objects may comprise: creating a dossier incorporating at least one dataset; creating a derived object using the at least one dataset; storing the derived object in memory, such that the derived object is a standalone object, independent of the dossier; and utilizing the derived object to generate and provide analytics information to a user via a display.

17 Claims, 12 Drawing Sheets

620

DATA ITEM 1
DATA ITEM 2
DATA ITEM 3
DATA ITEM 4
DATA ITEM 5
DATA ITEM 6
DATA ITEM 7
DATA ITEM 8
DATA ITEM 9
DATA ITEM 10
DATA ITEM 11
DATA ITEM 12
DATA ITEM 13
DATA ITEM 14
DATA ITEM 15
DATA ITEM 16

*FIG. 6C*

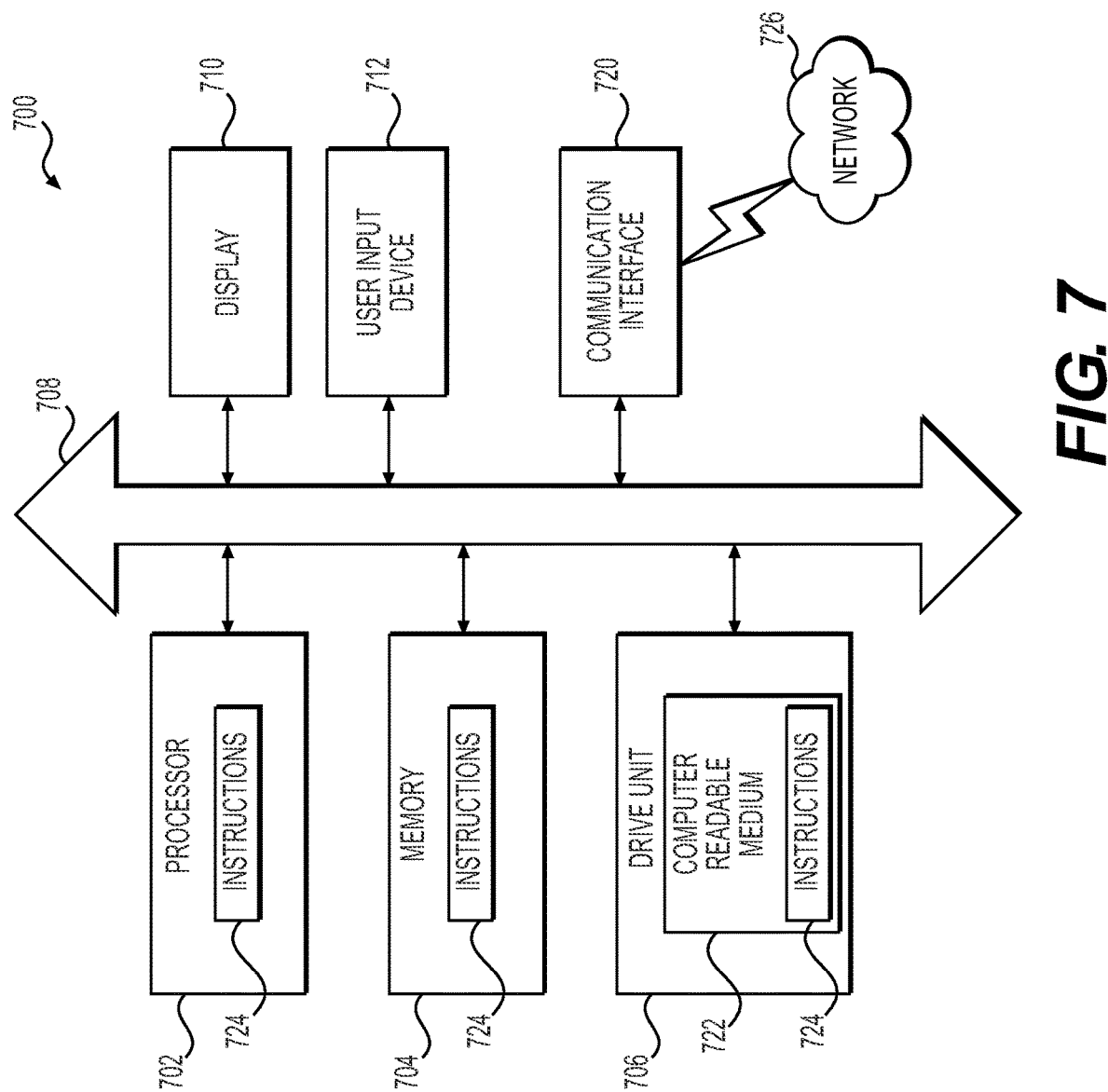

SYSTEMS AND METHODS FOR STORING BLEND OBJECTS

CROSS-REFERENCE TO RELATED APPLICATION

This application claims benefit to U.S. Provisional Patent Application No. 63/081,224, filed Sep. 21, 2020, the entire contents of which are incorporated herein by reference.

TECHNICAL FIELD

Embodiments of the present disclosure relate generally to management of datasets in a computing environment. More particularly, some aspects of the disclosure relate to customizing datasets used to prepare customized reports.

BACKGROUND

Data analytics has become an important tool in making data useful for users. Analytics may be based on objects (e.g., attributes or metrics) derived from one or more datasets. However, data analytics tools often need to be redefined for new projects. A need exists to make data analytics tools more easily available for reuse in different contexts.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

In one example, a computer-implemented method for creating standalone objects may comprise: creating a dossier incorporating at least one dataset; creating a derived object using the at least one dataset; storing the derived object in memory, such that the derived object is a standalone object, independent of the dossier; and utilizing the derived object to generate and provide analytics information to a user via a display.

In another example, a computer-implemented method for creating standalone objects may comprise: creating a derived object, wherein the derived object applies an equation to at least one dataset; saving the derived object; creating a first dossier incorporating the derived object, wherein the dossier has a first user interface displaying a first set of content; creating a second dossier incorporating the derived object, wherein the second dossier has a second user interface displaying a second set of content, wherein the second set of content differs from the first set of content; editing the derived object to generate an edited derived object; and propagating the edited derived object to the first dossier and the second dossier.

In another example, a system may comprise: one or more processors; and one or more computer readable media comprising instructions which, when executed by the one or more processors, cause the one or more processors to perform operations, the operations comprising: creating a dossier incorporating at least one dataset; creating a derived object using the at least one dataset; storing the derived object in memory, such that the derived object is a standalone object, independent of the dossier; and utilizing the derived object to generate and provide analytics information to a user via a display.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 6A-6C are diagrams for generating enriched blends, according to techniques presented herein.

FIG. 7 depicts a computer system that may be used to implement techniques presented herein.

DETAILED DESCRIPTION

Figure 1:
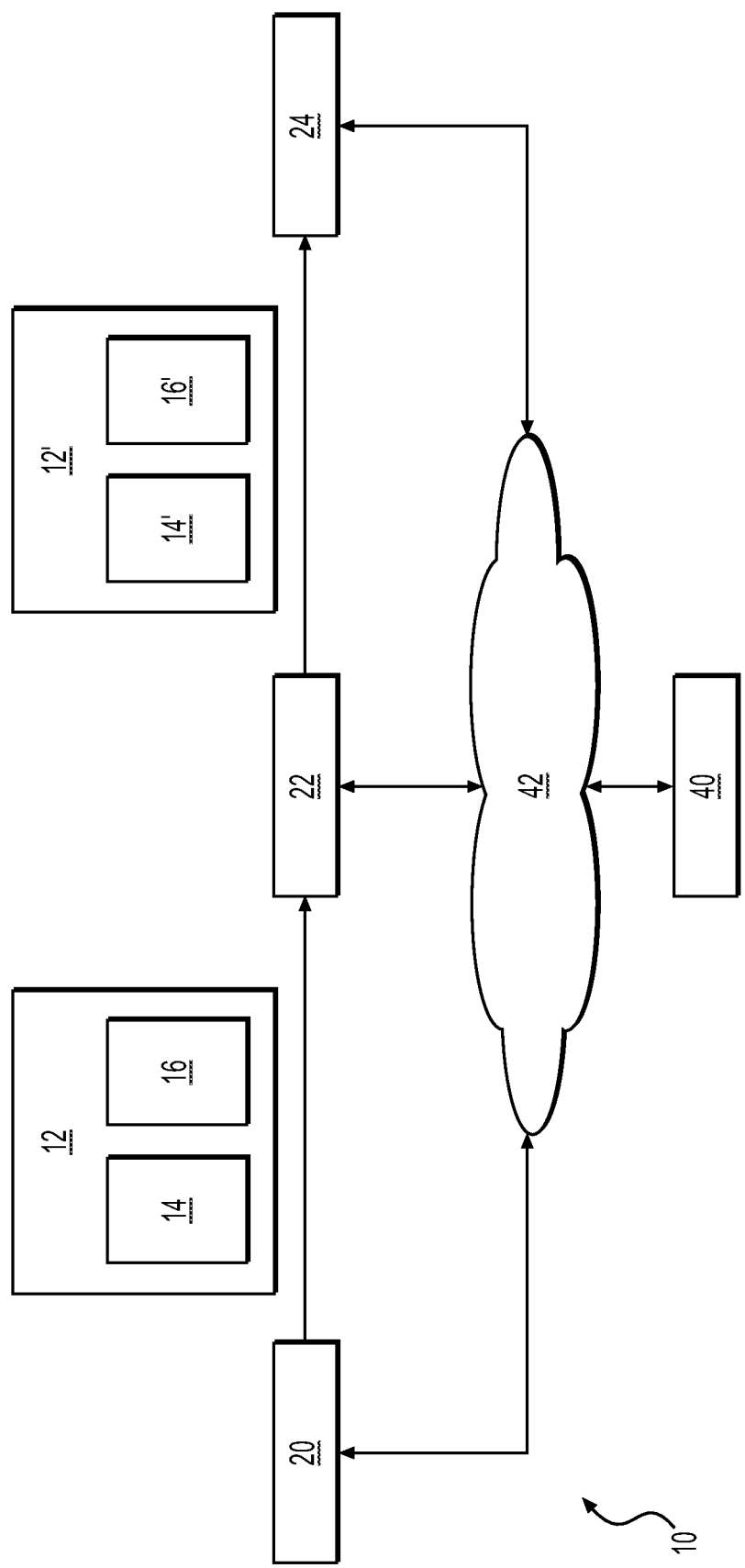
FIG. 1 depicts a flow chart showing sharing of a dossier, according to techniques presented herein.

A user may create a dossier, including datasets and contents based on the datasets, for use by other users. The dossier may facilitate consumption and generation of analytic measures by the other users. The contents of the dossier may be based on objects (e.g., attributes or metrics) derived from the datasets. Where the objects are associated with a particular dossier, those objects may be re-usable in additional dossiers by re-creating the objects or by basing the additional dossiers on the first dossier. In some techniques, changes to an object in one dossier might not propagate to the other dossiers. Techniques discussed herein may make objects that are available across dossiers and/or object changes that operate across dossiers.

Datasets of dossiers may support content (e.g., analytics) based thereon. In order to leverage datasets, users (e.g., administrators) may create blends of raw data sources (e.g., cubes, tables, or other arrays). The blends may include derived objects, such as derived attributes and derived metrics. An attribute may include a set of elements (e.g., first name, last name, version, owner, platform, etc.). A metric may apply a value to allow analysis of attributes (e.g., to compare attribute elements). Metrics may be reported against attributes. Metrics may be applied across multiple attributes. Derived attributes may blend together multiple attributes, and derived metrics may blend together metrics. Blends may function as a higher-level dataset that draws from multiple datasets.

Creating blends at the dossier level may be inefficient because such blends may be useful across dossiers. When generating new dossiers, it may be time consuming for a creating user to re-create blends each time. Furthermore, if a blend is created at a dossier level, changes to the blend over time will not be propagated to other dossiers using the same blend. This may result in broken links and give rise to security issues. Therefore, it may be desirable to create blends that span across all or across multiple dossiers and that may be pre-populated or pre-created when a new dossier is generated.

For example, when a user (e.g., a user creating a dossier) creates a blend, the user may select an option to save the blend. Updates to the blend may be propagated to one or more dossiers that utilize the blend. New dossiers may incorporate the saved blend.

The subject matter of the present disclosure will now be described with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

FIG. 1 is a flow chart 10 depicting the creation and sharing of a dossier 12. Dossier 12 may include/incorporate contents 14 and at least one datasets 16. For example, dossier 12 may include a contents panel 314 and a datasets panel 316 (see FIG. 4). Contents 14 may be divided into divisions (e.g., chapters), which may be further subdivided into subdivisions (e.g., pages or documents). Datasets 16 may underlie contents 14 and give rise to contents 14. Contents 14 may be a set of analytics that provide visualization or other analysis of aspects of datasets 16. Dossier 12 may provide a content-authoring (e.g., analytics authoring) interface. The term "dossier" may generally describe at least one user interface associated with a collection of documents, datasets, data analytics and/or sub-interfaces.

A creating user (e.g., an administrator) 20 may create dossier 12. Creating user 20 may select a grouping of contents 14 having various interfaces, such as documents, dashboards, reports, or other objects. Creating user 20 may create dossiers 12 for multiple entities (e.g., may be associated with a company administering dossier 12) or may be in-house with a particular entity utilizing dossier 12. Contents 14 may be presented with a specified layout, formatting, or sequence defined by creating user 20. Creating user 20 may also request or select various datasets 16 to be incorporated into dossier 12 and to be used in generating content 14. Dossier 12 may be distributed or shared with receiving users 22. For example, server 120 (FIG. 2) may facilitate sharing dossier 12 (e.g., server 120 may transmit dossier 12 to receiving user 22).

Dossiers 12 may display datasets 16 arising from data sources, including live data sources. Datasets 16 may be used to generate contents 14. For example, contents 14, such as a chart, table, map, or other visualization shown in a dashboard of a dossier 12, may be generated from a dataset provided by a database 30 (e.g., a database server) or other form of memory. The chart, table, or map may be updated to reflect current information from the database 30 each time a user views dossier 12. Datasets 16 dossier 12 may also include or reference a static dataset, and filters or other controls may operate on the static dataset. Similarly, dossier 12 may include pre-generated content elements that do not change.

Interfaces of dossier 12 may include interactive elements, such as filters and other controls that have behavior specified by, for example, creating user 20. In this manner, a user may view and interact with dossier 12 similar to an application. Users, such as receiving users 22, may interact with and/or edit dossier 12 in a variety of ways. For example, receiving users 22 may annotate contents 14 of dossier 12. For example, annotations may include comments, highlights, graphics, or other notations. Receiving users 22 may be also apply redactions or deletions. For example, receiving user 22 of dossier 12 showing sales data for a region may focus contents 14 of dossier 12 on only a portion of a region by reordering or deleting pages and by filtering datasets 16 to include data for a particular location in the region, so that contents 14 (e.g., charts and tables) are updated to show the information for the particular location.

Dossiers 12 may have a variety of characteristics, including permissions. When dossier 12 is shared with receiving user 22, that sharing may grant receiving user 22 access to a data source for viewing and use within the dossier but not modification rights. In some implementations, dossier 12 may define closed datasets 16. For example, a receiving user 22 may be able to filter or manipulate data from datasets 16 that a creating user 20 specifies, but the receiving user 22 may be restricted from adding new data sources to datasets 16 of dossier 12. Alternatively, receiving user 22 may be able to manipulate data from datasets 16.

Permissions of dossier 12 may also affect an ability of receiving user 22 to modify contents 14. Receiving user 22 may be able to fully manipulate contents 14 by, for example, adding or deleting chapters, pages, dashboards, or annotations. Additionally or alternatively, dossier 12 may be closed so that receiving users 22 are restricted from changing aspects (e.g., a structure) of dossier 12. For example, a receiving user 22 may lack permissions to add new chapters, pages, interfaces, documents, or interactive elements to dossier 12. However, even when receiving users 22 are restricted from certain activities, receiving users 22 may be permitted to add annotations and/or use controls that creating user 20 has included.

Dossier 12 may be shared with multiple receiving users 22, each of whom may manipulate dossier 12 in different manners, to create a dossier 12'. Thus, once a dossier 12 is shared, different versions of dossier 12 may be created. Each may link back to the original, master version. In some implementations, different versions may be tracked and stored by a server system 40, which may be in communication with users 20, 22, 24, directly or via, e.g., a network 42, in association with different user accounts corresponding to different receiving users 22. Users 20, 22, 24 may access dossier 12 and server system 40 using any suitable device (e.g., a computer or mobile device). As a result, a user may view, annotate, or share his own version of dossier 12' from multiple different devices. Local copies of dossier 12' may be stored, annotated, or shared, and these local copies may be synchronized with copies stored by server system 40.

Propagation of edits to dossier 12' by a receiving user 22 may be limited. A dossier may have persistent state for individual receiving users 22. Current state characteristics can be stored for each receiving user's 22 version of dossier 12', e.g., at a server and/or locally at a user device. As a result, when receiving user 22 applies filter settings using a control within dossier 12', those settings may be retained after dossier 12' is closed and reopened.

Receiving users 22 may pass on an annotated or modified version of dossier 12' to additional users 24. Dossier 12' may have annotations and/or changes made to one or both of contents 14 (crating contents 14') or datasets 16 (creating datasets 16'). Permissions of additional users 24 may be the same or different as permissions of receiving user 22 that shared dossier 12'. Edits made by receiving user 22 that passes on dossier 12 to additional user 24 may be propagated to additional user 24. However, modifications performed by receiving users 22 (and/or additional users 24) may not change the original dossier 12.

Figure 2:
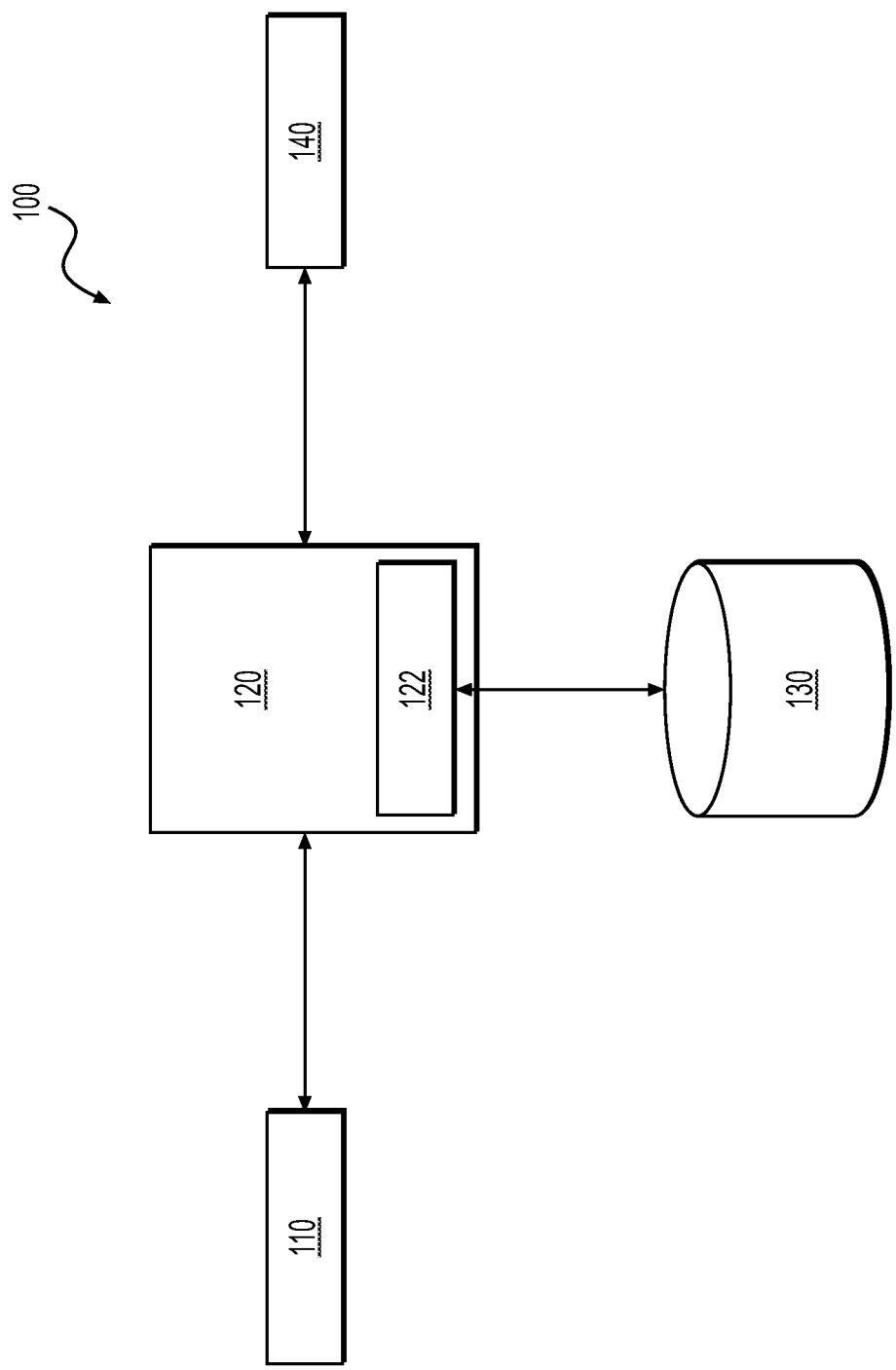
FIG. 2 depicts a system for creating and storing dossiers, according to techniques presented herein.

FIG. 2 depicts an example system 100 for creating and disseminating dossiers 12. Creating user 20 may utilize a computing device 110 to access at least one server 120 (which may have any of the properties of server system 40). Server 120 may provide access to a data analysis server 122, which may be included within server 120 or may be separate from server 120. Data analysis server 122 may analyze raw data such as tables, documents, spreadsheets, databases, or any other type of electronic file. Data analysis server 122 may provide a metadata layer between server 120 and a data storage device 130 (which may have any of the properties of database 30) and allows creating user 20 to generate files and interfaces (such as dossier 12) that illustrate the contents of the raw data of storage device 130. Computing device 110 may be any type of device that is configured to interface with server 120. For example, computing device 110 may be a desktop computer, laptop computer, tablet, mobile phone, or any similar device.

As creating user 20 builds dossier 12, server 120 may provide access to data analysis server 122. Server 120 may add links to dossier 12 based on the underlying data (e.g., datasets 16) that is referenced by the contents 14 of dossier 12. Server 120 may add to dossier 12 data identifying receiving users 22 with whom creating user 20 shares dossier 12 and any permissions or restrictions placed on each receiving user 22 by creating user 20. Additionally or alternatively, some of the above information may be stored in server 120 and referenced by dossier 12.

Receiving user 22 may access dossier 12 using a computing device 140, which may have any of the properties of computing device 110. An application utilized by receiving user 22 on computing device 140 may differ from an application utilized by creating user 20 on computing device 110. For example, receiving user 22 may use a viewer or a more simplified application than that used by creating user 20. When receiving user 22 annotates or otherwise edits dossier 12, those changes may be saved locally to receiving user 22 or may be saved in server 120, although changes may not be propagated to other copies of dossier 12, as discussed above. For example, where edits by receiving user 22 are stored in server 120, the edit (e.g., annotation) may be stored in server 120, along with data indicating that receiving user 22 made the change and/or data associating the change with a particular version of dossier 12 accessed by receiving user 22. As discussed above, if receiving user 22 shares an edited version of dossier 12 with additional user 24, the changes made by receiving user 22 may be propagated to additional user 24. The changes may be propagated because, for example, server 120 may store information that receiving user 22 has shared dossier 12 with additional user 24, and server 120 has associated the changes/edits with receiving user 22. Additionally or alternatively, the changes/edits to dossier 12 may be propagated because server 120 has associated the changes/edits with that version of dossier 12.

As discussed above, creating user 20 may change/edit dossier 12 (e.g., contents 14 of dossier 12). In making such changes, creating user 20 may change/edit the original file for dossier 12, and such changes may be stored in server 120, which may cause the changes/edits made by creating user 20 to be propagated to one or more receiving users 22 (and any additional users 24).

Figure 3:
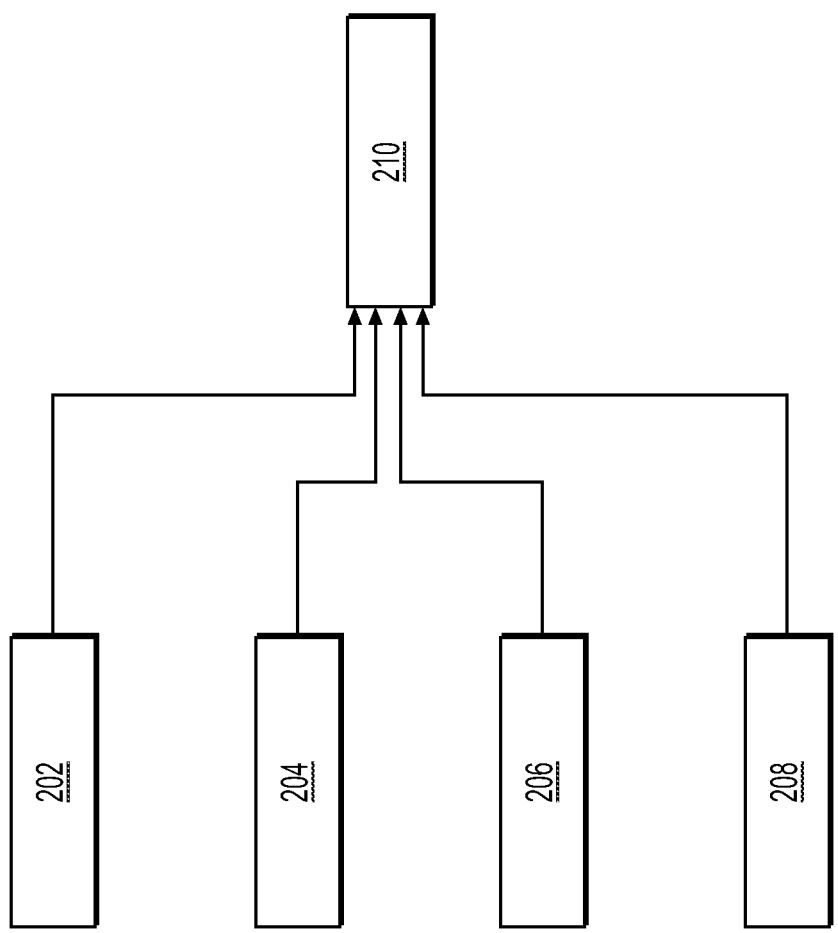
FIG. 3 is a flow chart depicting creation of a blend, according to techniques presented herein.

A dossier 12 may incorporate multiple datasets 16 (e.g., datasets 202, 204, 206, 208, shown in FIG. 3). Datasets 16 may include any suitable form of data. For example, datasets 16 may include data cubes, tables, or other types of arrays. As shown in FIG. 3, a user, such as creating user 20, may create a blend 210 from one or more datasets. Although four datasets 202, 204, 206, 208 are shown in FIG. 3, any suitable number of datasets may be used. Examples of blends 210 include derived objects, such as derived attributes and derived metrics, or combinations thereof, described in further detail below. Blends 210 may, for example, apply a set of equations to one or more datasets 16. Blends 210 may also include a combination of datasets, schema links, or other types of derived elements. A schema link may be a shortcut to an attribute. Examples of derived elements include mathematical operations of elements. For example, a derived element may be one attribute element divided by another attribute element.

Attributes and/or metrics may be objects used on reports of contents 14. An attribute may be a business concept, such as "product," "employee," "month," or other parameters. For example, attributes may correspond to column headers in a database. Attributes provide a context for metric. A metric may be a business measure or key performance indicator, such as revenue, profit, employee headcount, or probability of purchase. Metrics may include calculations performed on data from datasets 16, the results of which are displayed on a report. A metric on a report may show a list of values used for analytical calculations.

A derived attribute may, for example, a) combine attributes (e.g., combine city and state to produce city, state), b) change a data type of an existing attribute (e.g., string, number date), c) change a metric to an attribute, d) create additional date-related attributes, and/or e) perform more sophisticated functions (e.g., generate ranges based on metrics).

A derived metric may be created based on existing metrics. For example, a derived metric may be a function of two existing metrics. Derived metrics may perform column math, (e.g., calculations on metrics), without regenerating or re-executing SQL against the underlying datasets 16. Derived metrics may also be generated from an attribute (e.g., converting an attribute to a metric).

Blends 210 may be particularly helpful in generating content 14. For example, blends 210 may leverage advanced functionality that may be difficult for general users (e.g., receiving users 22) to implement. For example, a derived object/attribute/metric may involve a complicated function that requires an understanding of data structures beyond that of a typical receiving user 22. A creating user 20 may create blends 210 for use with dossier 12, leveraging the specialized knowledge and skills of creating user 20.

Creating user 20 may elect to save blend 210 so that it is a blend object (e.g., a standalone object) available across multiple dossiers 12. Thus, the same blend 210 may be utilized in an existing dossier 12 and in a new dossier 12. A creating user 20 may select datasets to be included a particular dossier 12. Similarly, a creating user 20 may also select saved blends to be included with the dossier. A blend object that is available across dossiers 12 may be added at creation of dossier 12 or may be added to an existing dossier 12 (e.g., by creating user 20). A blend 210 may be designated as a blend object at the time of creation. Additionally or alternatively, a blend 210 (e.g., a derived object) may later be converted from a dossier-specific blend 210 to a standalone blend object available across dossiers.

If creating user 20 updates blend 210 that is a blend object (e.g., modifies which datasets 16 underlie blend 210 or modifies the equation defining blend 210), those updates may be propagated to each dossier 12 utilizing blend 210, similarly to how updates to datasets 16 may be propagated to dossiers 12 such that live data may be used in dossier 12.

A creating user 20 may define various permissions (e.g., via an access control list (ACL)) for defining how receiving user 22 (and additional users 24) may interact with dossier 12, including blends 210 (which may be blend objects). Permissions additionally or alternatively may vary across individual users, rather than applying universally to all receiving users 22/additional users 24.

For example, a creating user 20 (and/or a receiving user 22 or additional user 24 having appropriate access control list (ACL) permissions and/or privileges) may create new blends 210 that are blend objects. Creating users 20 and/or receiving users 22 may also add new datasets 16 to an existing dossier 12 that already includes a blend 210 that is a blend object. New datasets 16 added may be limited to datasets that do not underlie blend 210. Creating users 20 and/or receiving users 22 with appropriate permissions may also add a derived metric or other blend 210 that uses blend objects. The new derived metric or other blend 210 may be created/saved as a blend object or may be local to a dossier. Creating users 20 and/or receiving users 22 with appropriate permissions may also promote a blend 210 to a blend object. A creating user 20 and/or receiving user 22 may also opt to create a blend 210 that is dossier-specific (i.e., is not a blend object).

In some instances, receiving user 22 may have read/write privileges specific to a dossier 12, such that they may edit any portion of dossier 12, including blend 210 that is a blend object, but those edits will not be propagated to other dossiers 12 (including other dossiers using blend 210). Edits to blend 210 that is a blend object may de-certify blend 210 (indicating that it is no longer the same as the original blend object created by an authorized party). Alternatively, receiving user 22 may have more limited read/write privileges specific to a dossier 12. For example, receiving user 22 may have permission to create additional blends 210 specific to a particular dossier 12 (e.g., not available in new dossiers 12 and not propagated to other dossiers 12) that may be shared as other edits to dossier 12 are shared, as described above. For example, a copy of dossier 12 shared with additional user 24 by receiving user 22 may include both blends 210 created by creating user 20 that are available across dossiers and blends 210 created by receiving user 22 that are dossier-specific.

Figure 4:
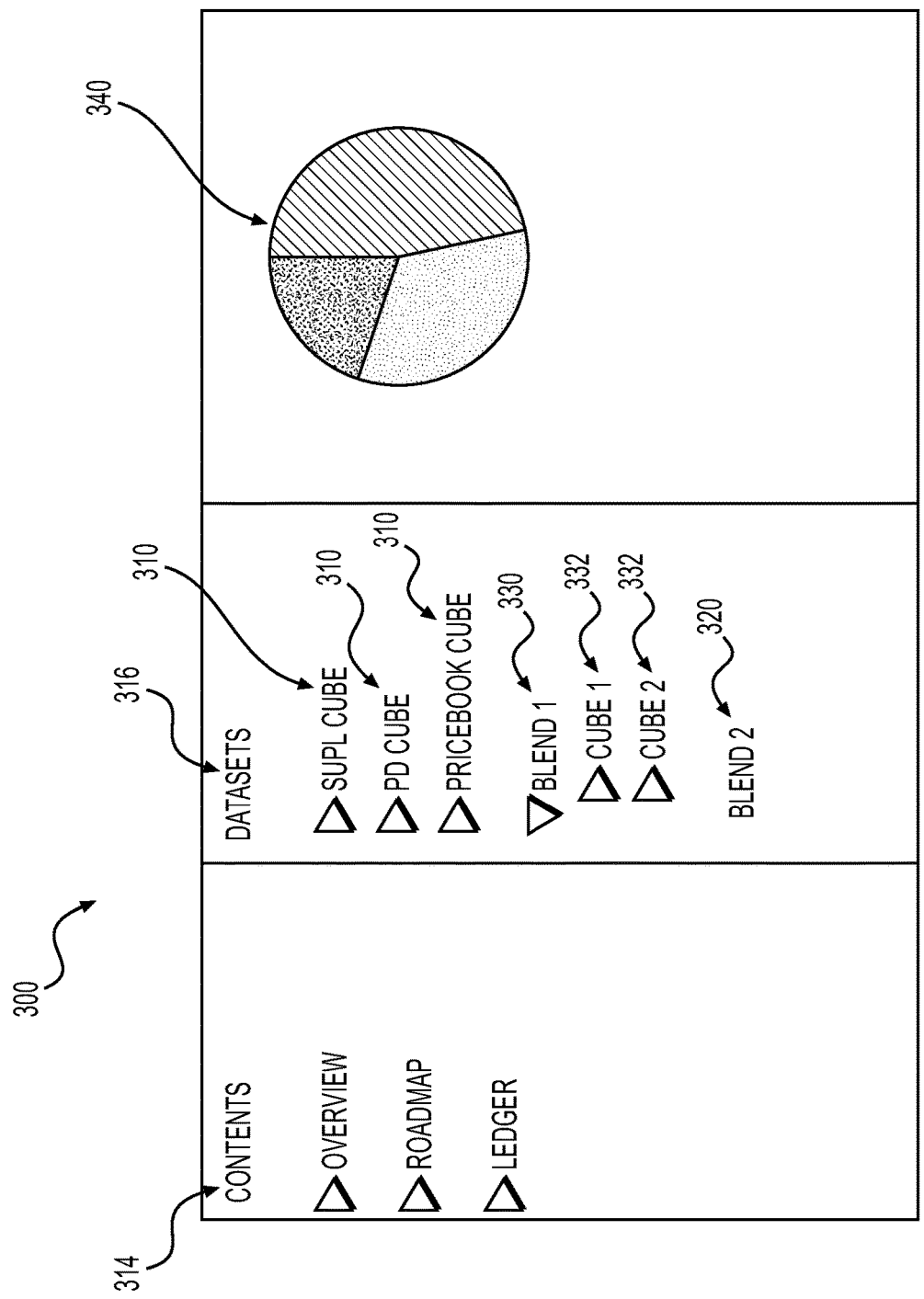
FIG. 4 depicts an example user interface of a dossier, according to techniques presented herein.

FIG. 4 depicts an exemplary dashboard 300 of a dossier 12, which may be displayed to a receiving user 22. As shown in FIG. 4, a dashboard may display a contents panel 314 organizing contents 14, and a datasets panel 316 organizing datasets 16. One or more charts 340 representing objects based on datasets panel 316 may be displayed. Contents panel 314 may depict chapters (e.g., overview, roadmap, ledger), which may each include numerous chapters/documents or other subdivisions.

Datasets panel 316 may depict a plurality of datasets 310 that are available to generate analytics (e.g., contents panel 314). As shown in FIG. 4, datasets panel 316 may include three cubes, although that number and array type is merely exemplary. Datasets panel 316 may also depict blend objects 320, 330, which may be examples of blends 210. Blend objects 320, 330 may have any of the properties of blends 210, described above. One or more datasets may underlie blend objects 320, 330. For example, blend objects 320, 330 may be a derived attribute or derived metric drawing on one or more datasets.

Different blends 210 may have different permission settings. As shown with respect to blend object 320, permissions of dossier 12 may prevent a receiving user 22 from interacting with (e.g., viewing, manipulating, altering, etc.) datasets underlying 320. For example, a drop down arrow may be absent, such that receiving user 22 may not expand the view of blend object 320 to view underlying datasets. Receiving user 22 may only have access to blend object 320, while the underlying data may be protected. For example, an entity or creating user 20 may determine that a particular parameter (e.g., a parameter that extends across the datasets 16 underlying blend object 320) may be accessed only via blend object 320.

In contrast, blend object 330 may have permissions settings such that receiving user 22 may access datasets 332 (e.g. cubes) underlying blend object 330. For example, receiving user 22 (or creating user 20) may be able to generate new, dossier 12-level blends (e.g., blends stored as a dossier definition) using datasets 332 and/or blend object 330. Additionally or alternatively, receiving user 22 may be able to generate contents 14 using datasets 332. Blend object 330 may have other actions available similar to those above (e.g., editing blend object 330, which may result in de-certification).

Blends 210 desired to be blend objects used across dossiers 12 may be stored similar to other types of datasets 16 (e.g., in database 30) such that blends 210 may always be pointed to when creating new dossiers 12 (or editing dossiers 12). Alternative methods may also be used to create and/or blends 210 that are blend objects.

Figure 5A:
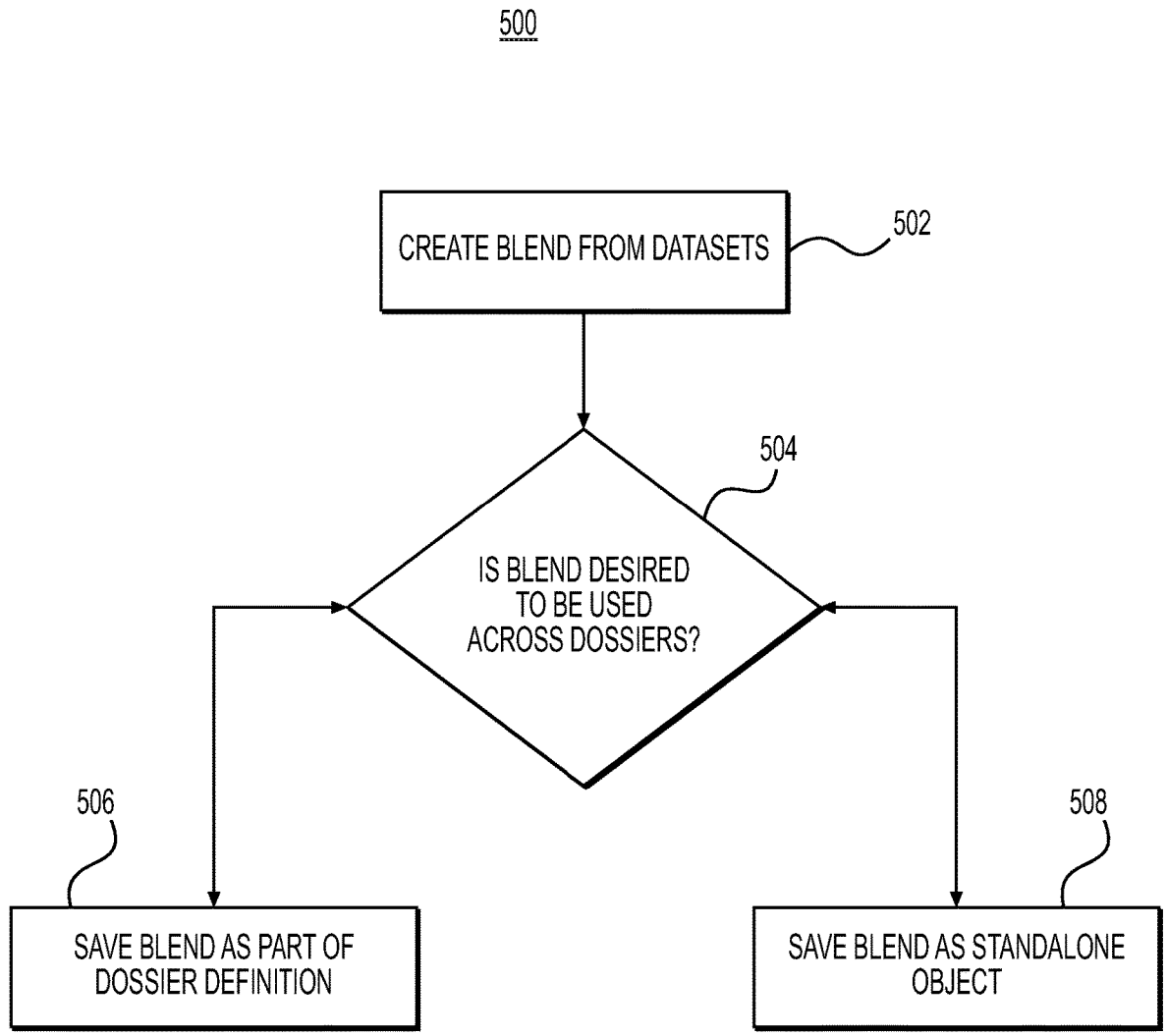
FIGS. 5A-5D is a flow chart of a method for creating a standalone blend object, according to techniques presented herein.

FIG. 5A shows an overview of a method 500 for working with blends 210. In step 502, a user (e.g., creating user 20)

may create a blend 210 from datasets 16. In step 504, the user may determine whether the created blend 210 is desired to be used across dossiers 12. If blend 210 is desired to be specific to a particular dossier 12, in step 506, blend 210 may be saved as part of the dossier 12 definition (e.g., in database 30). If, on the other hand, blend 210 is desired to be used across dossiers 12, blend 210 may be saved as a standalone blend object in step 508 (e.g., in database 30). A separate database may be dedicated to blend objects, or blend objects may be stored in the same database as dossier-specific blends 210. Where blends 210 that are blend objects are stored in the same location as blends 210 that are dossier-specific, the different types of blend 210 may be stored differently from one another.

Figure 5B:
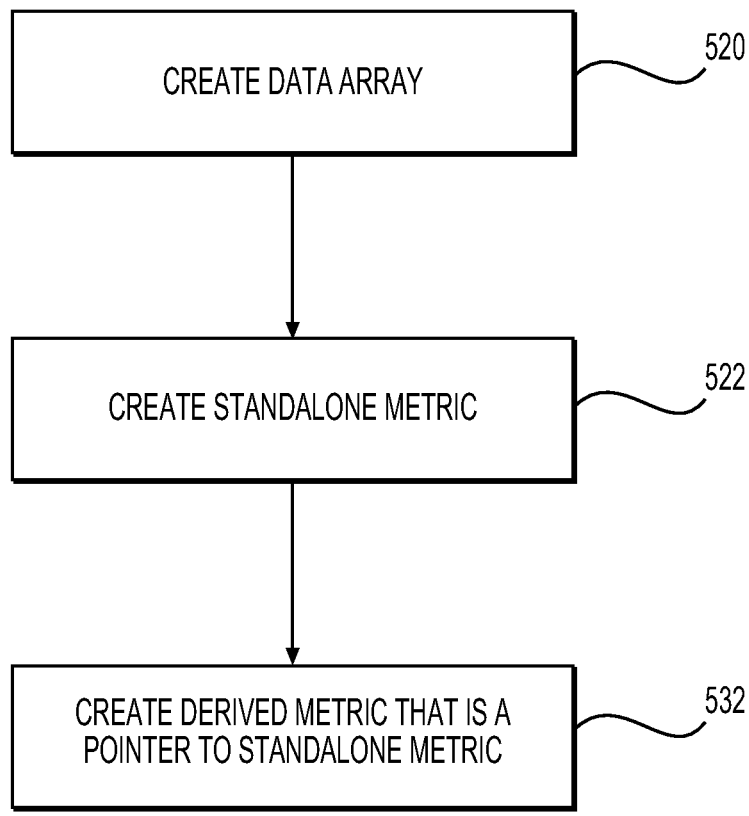
Figure 5C:
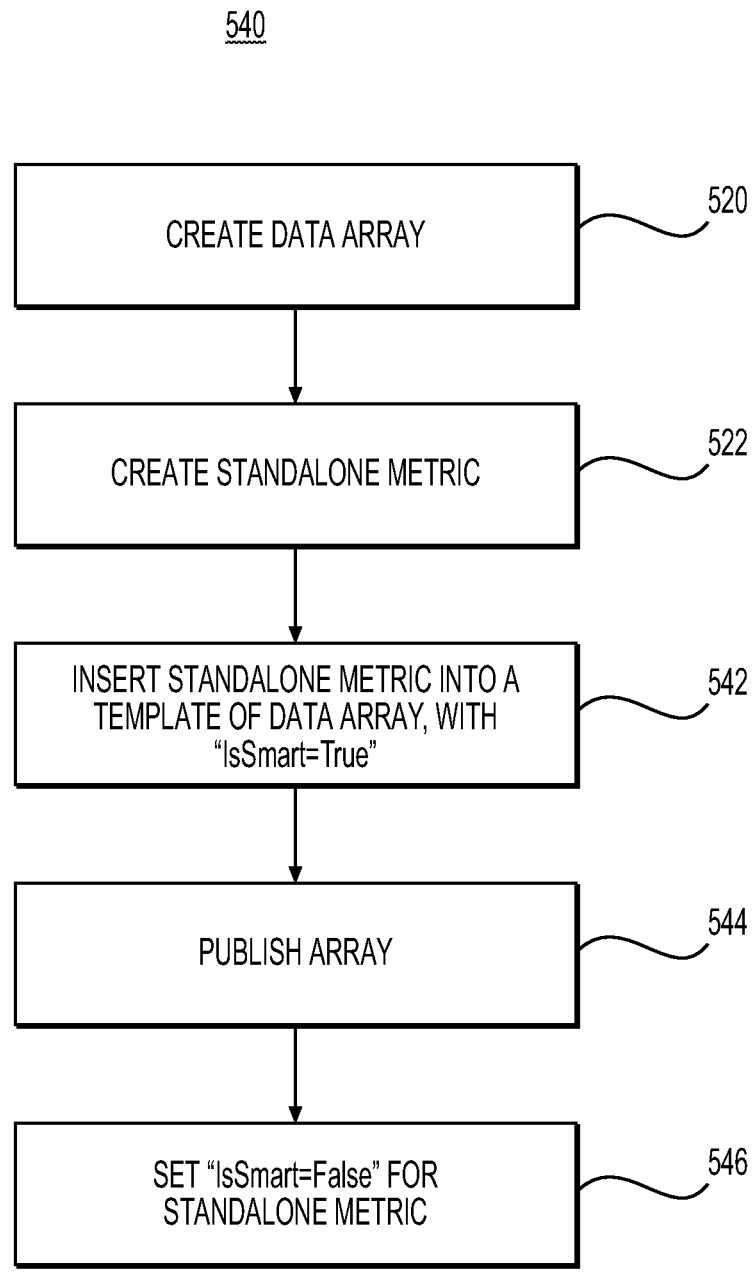
Figure 5D:
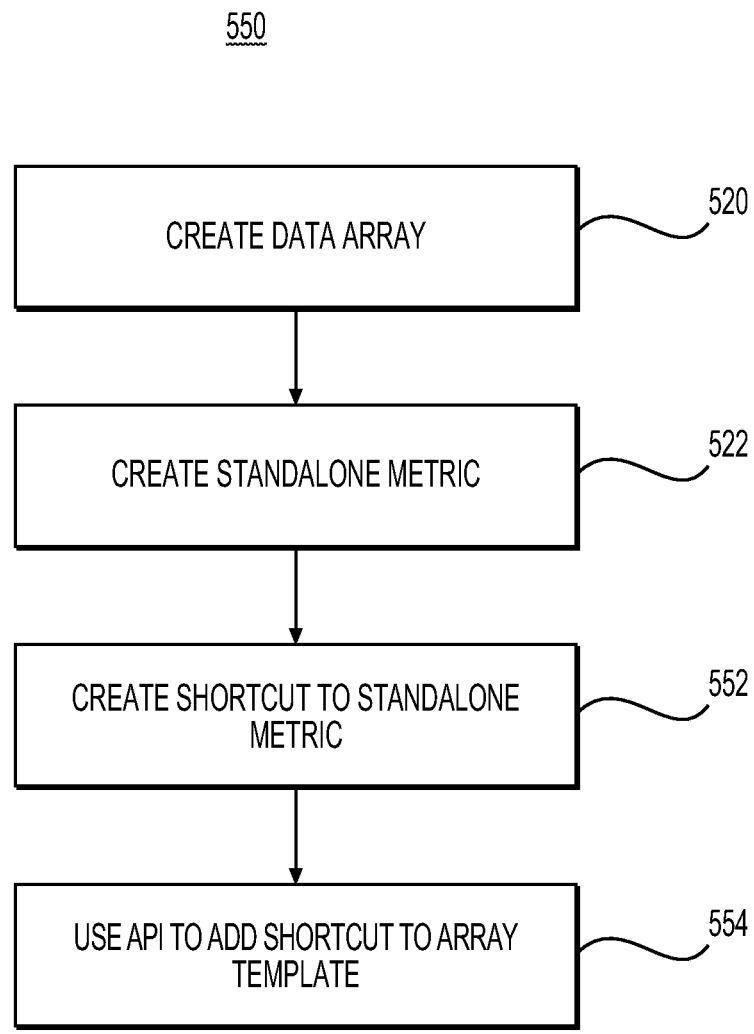

FIGS. 5B-5D show further details of exemplary methods for creating blends as standalone objects. The steps of FIGS. 5B-5D may provide further elaboration on step 508, above.

Examples are provided below of methods/systems for creating and/or storing blends 210 that are blend objects (e.g., blend objects 320, 330). The examples below are non-limiting and merely provide possible implementations. Certain steps may be repeated across different methods, and like steps are given like reference numbers, where appropriate.

It may be desirable for any method/system creating and storing blends that are blend objects to (a) allow an administrator/creating user 20 to retain full control and (b) provide governed self-service (e.g., to receiving users 22). Further details of these goals are provided below.

With respect to the goal of allowing an administrator/creating user 20 to retain full control, the following example is exemplary. A creating user 20 (e.g., an administrator, an information technology (IT) department, or other party) may create an array (e.g., a cube) that includes, for example, attributes such as Country, Region, Category, Subcategory, and a metric (e.g., a sum, defined by, for example, the equation M00=Sum(Fact){~+}, where M00 refers to the metric. Cube 1 may be used to build a dashboard/page/document of dossier 12. The desired analysis of the dashboard my require a dimensional derived metric, such as: DM04=Sum(M00){~+, !Country+, !Region+}, where DM04 refers to the derived metric. The derived metric may function to disallow aggregation of the value of M00 across a Geography dimension (i.e., not group by Geography dimension), but group the metric M00 only by a Category dimension. As discussed below, the derived metric DM04 may have flags IsSmart=True and AggFromBase=True set.

If the derived metric (DM04) is stored as a dossier definition, embedded inside dossier 12, when dossier 12 is released to users, each user may save a copy of the dossier to their own folders. All embedded objects (including derived metric DM04) may be copied as embedded objects within the new, saved copies of dossier 12. Creating user 20 (e.g., an IT department) may lose control of the DM04 derived metric, because each user has a copy of its own DM04 derived metric.

With respect to the goal of providing governed self-service, an IT department/administrator may desire to allow users to design dossiers 12, while retaining full control of the datasets 16 and important objects (e.g., metrics or derived metrics) underlying dossiers 12. A metric may be a very powerful object due to its computational ability. However, metrics may also be very complex to build/create. For example, a metric may include dimensioning (grouping and/or filtering), conditionality, and/or transformation. Writing a complex metric may not be a suitable task for a receiving user (e.g., a non-IT personnel member), although the receiving user may have sufficient skill to create simple metrics/attributes. Therefore, it may be desirable for creating users 20 (e.g., IT departments or administrators) to be able to generate blends 210 (e.g., cubes, metrics, etc.) that are available to receiving users 22. Furthermore, the same blend 210 may be useful across groups of users and across dossiers 12. As discussed above, if a blend 210 is saved as a part of the dossier (e.g., the dossier definition), such blends 210 are not available as desired.

As discussed above, flags of metrics may define behavior and which influence solutions for creating blends 210 that are blend objects. Flags include, for example, an "IsSmart" flag (when this is turned on, the metric is often referred as a "smart metric"). Smart metrics may be compound metrics, which require the use of a subtotal prior to calculating final value. A smart metric may be calculated by an analytical engine at the end of a process. In another example, an "AggFromBase" (AFB) flag may indicate that the metric needs to be calculated by a cube setting instruction ("CSI") engine or SQL engine. In another example, a "SubtotalFromBase" (SFB) flag may be used for a metric that is defined to calculate "Count<Distinct>" (count of distinct elements) with the expectation that its subtotal is also calculated from the cube. The "base" in the AFB and the SFB may refer to a base metric.

In at least some cases, smart metrics might not be evaluated by the CSI or SQL engine but instead will be evaluated by an analytical engine. For SFB metrics, the CSI engine may generate multiple" Count<Distinct>" calculations (at several levels to calculate Subtotals) only when the SFB metric does NOT exist in the base.

In one example for creating a blend 210 that is a blend object, a metric may be an unrooted managed object. An unrooted managed object may be managed by a system administering dossiers 12 but may not be stored in a particular folder. If another object does not use the metric, the metric will normally be deleted according to a schedule. An interface may allow a user to search for such unrooted managed objects. For example, a user may right mouse click on a cube and search for its components after selecting an option allowing for display of managed objects. The user may create a new metric using the unrooted managed object (for example, by dragging and dropping the unrooted managed object from the search window to an editor window). The IsSmart and AFB flags may be marked as true (or both flags may be marked or only the AFB flag may be marked as true). The newly created metric may become a standalone metric. Alternatively, some or all metrics may, by default, be standalone metrics.

In methods 530, 540, 550, below, a creating user 20 may first create a data array in step 520. Alternatively, an existing array may be used, and step 520 may be omitted. In step 522, a standalone metric may be created, using the principles above. Alternatively, the standalone metric may have previously been created/an existing standalone metric may be used, and step 522 may be omitted.

In examples, including example method 530 of FIG. 5B, a derived metric may be a pointer (shortcut to another metric). As discussed above, DM04 may be a standalone metric. Another derived metric may simply be a pointer to DM04. For example, creating user 22 may create a template dashboard (e.g., called "Dashboard10"). Creating user 22 may create a new dossier or a new page or dashboard for an existing dossier. For example, creating user 20 may create an object using, for example, a cube as a dataset (e.g., using a dashboard such as a template dashboard). In step 532, creating user may create a derived metric using, for example, the equation DM11$=DM04, where DM11$ is the new derived metric. DM11$ may simply be a pointer to DM04 (which may be a standalone metric). Dashboard10 may then be made available to all users.

In this example, derived metric DM11$ may be embedded inside of Dashboard10. Upon a receiving user 22 saving a copy of Dashboard10 (the copy may be referred to as Dashboard 10a), derived metric DM11$ may also be copied inside of Dashboard10a to become derived metric DM11$a. All copies of DM11$ may be a pointer to standalone metric DM04. Therefore, an administrator may retain full control of derived metric DM04, and any modifications to DM04 will be reflected in all copies of Dashboard10. This example may also provide self-service to receiving users 22, because Dashboard10 serves as a starting point for each receiving user 22. The ability to set permissions for which receiving users 22 may execute DM11$ (and therefore DM04) is limited because all receiving users 22 who have access to Dashboard10 will automatically have an ability to execute DM11$ (because DM11$ is an embedded object of Dashboard10). This example may be particularly useful for metrics requiring an SFB flag be set to true, since this type of metric may not be based on a cube template.

In another example, such as method 540 of FIG. 5C, a cube (e.g., a cube called "Cube01") may have a standalone metric DM04 in it. Standalone metric DM04 may have, for example, the definition above, and M00 may be a standalone metric. A standalone metric may be searched in metadata. A standalone metric might not belong to a particular dashboard, and may be usable across multiple dashboards. In step 542, standalone metric DM04 may be inserted into a template of Cube01, with metric DM04 having the IsSmart flag set to true. Use of the IsSmart flag will cause the SQL Engine not to put DM04 into tabular data. Following publishing of Cube01, in step 544, the IsSmart flag of standalone metric DM04 may be changed to false, in step 546.

Standalone metric DM04 may be on the template of Cube01, and standalone metric DM04 may remain as a standalone. A creating user 20 (or other administrator) may set ACL to deny access to standalone metric for DM04 for desired users.

Additionally or alternatively, and incremental refresh report ("IRR") may be designed to add, delete, and/or refresh data while removing the standalone metric DM04 from the IRR template because, possibly, the only purpose of the DM04 metric is that it is present in the cube and available/shared for all dossiers 12. An IRR may be an object that may be used to refresh data in a cube. An IRR may allow updating a portion of data of a cube without updating the entire data of the cube. Metric M00 (the input for DM04) may need to be retained on the IRR template.

In another example, such as method 550, shown in FIG. 5D, a further smart metric, "DM12$" may be created in step 552, where DM12$=DM04 (i.e., DM12$ is a shortcut to DM04). The IsSmart flag may be set to "true" for DM12$. An API may be used to add metric DM12$ into a cube template in step 554. In such a scenario, the SQL engine may, due to the IsSmart flag, operate as if DM04 is not in the Metric Info of the DSSTable, and therefore the SQL engine may not create an additional empty metric slice. Metric Info may be a collection of information such as: Metric Name, Global Unique ID (GUID), Modification Time, Creation Time, etc. This information may be stored in metadata in the DSSTable. An empty metric slice may be a metric with a null data value. Therefore, the cube may be republished with metric DM12$ available for all users.

In the above example, an application may take a .txt file as an input, called "parameters.txt." For example, the "parameters.txt" file may provide:

strConnectionType=SERVER
strIServerHost=10.21.20.132
strIServerPort=34952
strMSTRUser=administrator
strMSTRPassword=<blank>
strMSTRProject=MicroStrategy Tutorial
strCubeGUID=70DE9CA343CFA92E03D82A9
　A5DC1B621
arrMetricGUIDList=B71CF1B84EE8A3B312C0
　DCBCA1640
133,ACAFF6674A3E960B875DF6BE408768D7
strOperation=remove When the program is running, a dialogue may appear indicating "Running AddExternalMetricIntoDataImportCube.exe."

According to an implementation of the disclosed subject matter, blend 210 may be generated from two or more datasets, as disclosed herein. Additionally, one or more enrichments may be applied to two or more datasets to generate an enriched blend (e.g., blend 210 may be an enriched blend). The enrichments may include, but are not limited to, addition of data (e.g., columns, attribute columns, metric columns), addition of tables, linking relationships, filtering (e.g., data filtering, filtering based on matching values in datasets, etc.), aggregates, groupings, joins, materializations, data redactions, covert format (e.g., convert to upper case), collapse, remove rows/columns, creating subfolders, or the like. The multiple datasets including enrichments may be published as an enriched blend.

The one or more enrichments may be auto generated and may be automatically implemented or may be presented for user selection and/or implementation. According to an implementation, a user may provide one or more enrichments that may be implemented to generate an enriched blend. The one or more enrichments may be automatically generated for implementation or acceptance by a user based on properties of one or more properties, datatype, sample data, statistical data, or the like in one or more columns. For example, a machine learning model may be provided the columns from two or more datasets. The machine learning model may determine that, for a given column, the statistical distribution of data within the column is heavily weighted to a given range. Accordingly, the machine learning model may output the given range or the weights associated with the range so that data or weights associated with the range can be extracted or linked for use in the resulting blend.

According to an implementation of the disclosed subject matter, one or more tables (e.g., attributes, metrics, etc.) may be hidden. For example, for a given business case, certain complexity provided via one or more tables may be hidden such that an end user is not provided the hidden tables and their associated attributes, metrics, etc. For example, the contents 314 of FIG. 3 may be presented to a user, as disclosed herein. According to the implementation disclosed above, the contents 314 may be based on a blend that includes hidden tables such that contents 314 is a simplified version of contents that may be presented to a user if the tables hidden for simplicity were not hidden.

According to an example, one or more tables and there associated hidden data (e.g., attributes, metrics, etc.) may be output by a machine learning model. The machine learning model may receive, as inputs, a blend, tables associated with a blend, metrics, attributes, etc., associated with the tables, use case data (e.g., user data, industry data, sector data, past use data, etc.), and the like. The machine learning model may identify one or more tables to hide based on the input. For example, the machine learning model may analyze historical use of data for a given user or group of users and may determine that, based on the historical use, the given user or group of users is unlikely to require three tables as data associated with those three tables has not been accessed and/or interacted with for a threshold period of time. Accordingly, the three tables may be hidden such that the content provided using a resulting blend does not include data from the three tables. According to an implementation, a user providing input for generating a given blend may identify one or more tables to hide and/or may verify an output by the machine learning model prior to hiding the one or more tables.

According to an implementation, one or more tables may be hidden based on security criteria. According to this implementation, the security criteria may be a security clearance, a security level, an access restriction, or the like. The security criteria may be associated with one or more blends, tables, users, groups, or a combination of the same. For example, data in a given table may have a security level associated with such that a user that does not meet or exceed the security level may not have access to the data. A blend's security level may correspond to the highest security level associated with a table or data included in the blend. A user that does not meet or exceed the highest security level associated with a blend's tables or data may not gain access to content generated using the blend. Accordingly, according to an implementation, a lower security blend may be generated that hides the tables or data having the highest security level, there by lowing the security level of a corresponding blend. According to an implementation, a user or group's security level may be received and a given blend may be generated by hiding tables or data is at the user or group's security level or below.

Figure 6A:
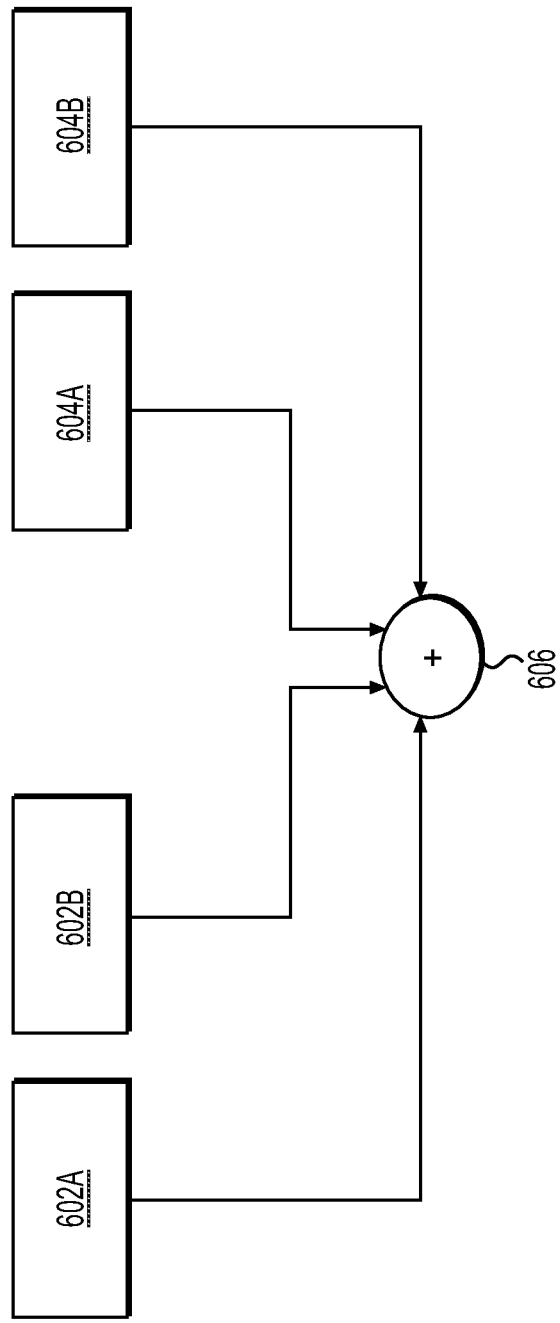
Figure 6B:
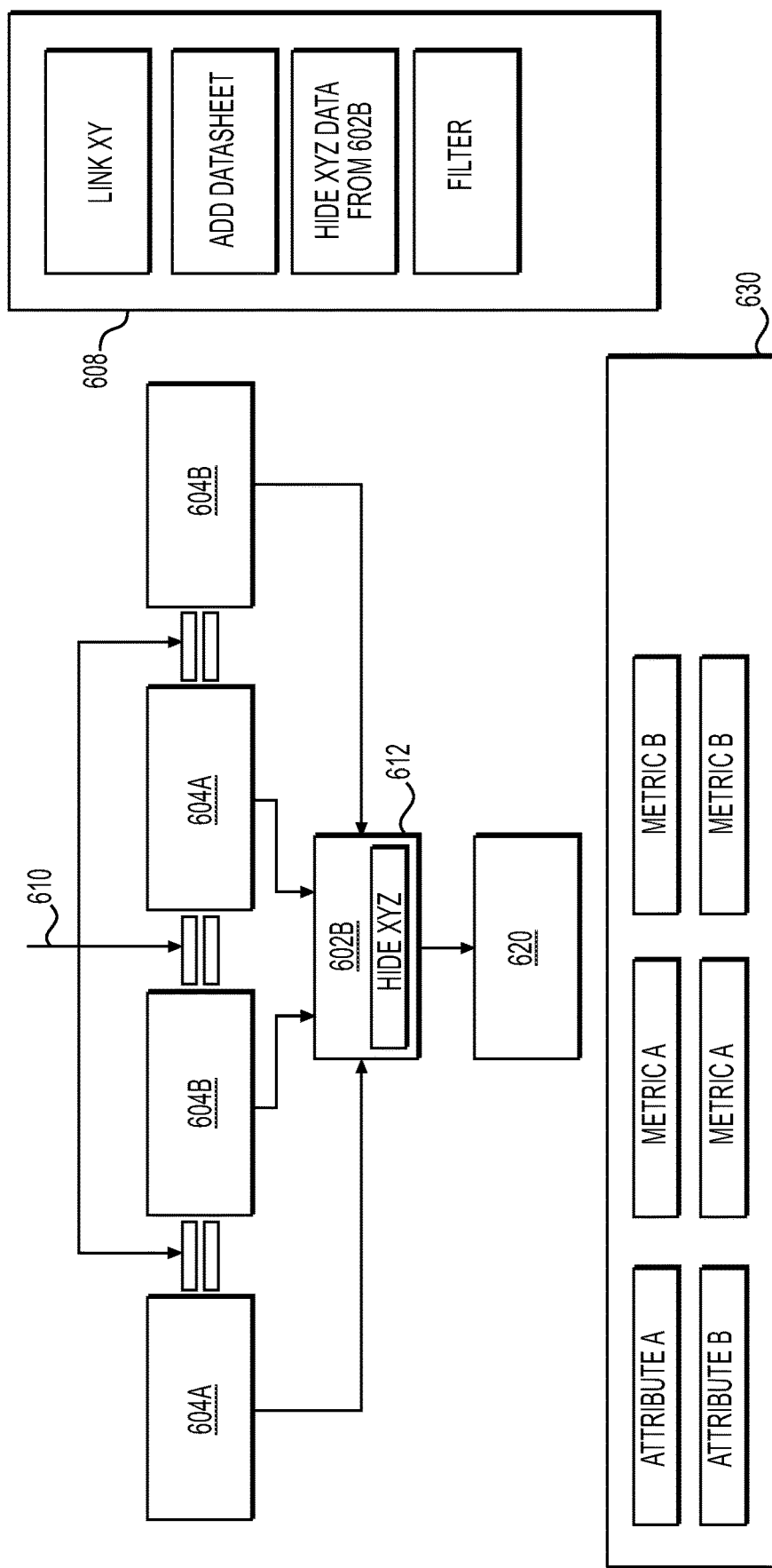

FIGS. 6A-6C are example diagrams for generating enriched blends, in accordance with implementations of the disclosed subject matter. As shown in FIG. 6A, imported data 602A and 602B as well as external data 604A and 604B may be received at a data aggregator 606. The imported data 602A and 602B as well as external data 604A and 604B may be identified by a user or may be identified by a machine learning model to be used to generate a blend 310. The imported data 602A and 602B may be imported from an already available dataset (e.g., in storage).

As shown in 6B, one or more enrichment recommendations 608 may be generated (e.g., by a machine learning model), as disclosed herein. The enrichment recommendations 608 may be automatically applied to the combined imported data 602A and 602B as well as external data 604A and 604B or may be provided to a user for selection and application. A data preview 630 may present data associated with, for example, imported data 602A and 602B, external data 604A and 604B, a given application of an enrichment recommendations 608, or the like. For example, by hiding given data (e.g., a portion of imported data 602A), the data preview 630 may show the remaining data remaining in imported data 602A (e.g., up on selecting imported data 602A) and may hide the hidden data. According to an implementation, the data preview 630 may provide statistical analysis from data.

As shown in FIG. 6B, enrichment recommendations 608 may include one or more of linking enrichments (e.g., to link different data for analysis and/or statistical purposes), adding datasets, hide data (e.g., as disclosed above), filter data, or the like. As also shown in FIG. 6B, imported data 602A and 602B as well as external data 604A and 604B may be linked together at 610. Additionally, a portion of the imported data 602B may be hidden, as indicted by "Hide XYZ" at 612. The linked and hiding may be done based on the corresponding enrichment recommendations 608.

An enriched blend 620 may be generated based on the imported data 602A and 602B and external data 604A and 604B and the enrichment recommendations 608. As shown in FIG. 6C, enriched blend 620 may include a plurality of data. The plurality of data in enriched blend 620 may be modified versions of the imported data 602A and 602B and external data 604A and 604B such that plurality of data may be modified based on the enrichment recommendations 608 (e.g., linking, additional datasets, hidden data, filtering).

Unless specifically stated otherwise, as apparent from the following discussions, it is appreciated that throughout the specification discussions utilizing terms such as "processing," "computing," "calculating," "determining", "analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

FIG. 7 illustrates an implementation of a computer system designated 700. The computer system 700 can include a set of instructions that can be executed to cause the computer system 700 to perform any one or more of the methods or computer based functions disclosed herein. The computer system 700 may operate as a standalone device or may be connected, e.g., using a network, to other computer systems or peripheral devices.

In a networked deployment, the computer system 700 may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 700 can be implemented using electronic devices that provide voice, video, or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics processing unit (GPU), or both. The processor 702 may be a component in a variety of systems. For example, the processor 702 may be part of a standard personal computer or a workstation. The processor 702 may be one or more general processors, digital signal processors, application specific integrated circuits, field programmable gate arrays, servers, networks, digital circuits, analog circuits, combinations thereof, or other now known or later developed devices for analyzing and processing data. The processor 702 may implement a software program, such as code generated manually (i.e., programmed).

The computer system 700 may include a memory 704 that can communicate via a bus 708. The memory 704 may be a main memory, a static memory, or a dynamic memory. The memory 704 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 704 includes a cache or random-access memory for the processor 702. In alternative implementations, the memory 704 is separate from the processor 702, such as a cache memory of a processor, the system memory, or other memory. The memory 704 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 704 is operable to store instructions executable by the processor 702. The functions, acts or tasks illustrated in the figures or described herein may be performed by the programmed processor 702 executing the instructions stored in the memory 704. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 700 may further include a display 710, such as a liquid crystal display (LCD), an organic light emitting diode (OLED), a flat panel display, a solid-state display, a cathode ray tube (CRT), a projector, a printer or other now known or later developed display device for outputting determined information. The display 710 may act as an interface for the user to see the functioning of the processor 702, or specifically as an interface with the software stored in the memory 704 or in the drive unit 706.

Additionally or alternatively, the computer system 700 may include an input device 712 configured to allow a user to interact with any of the components of system 700. The input device 712 may be a number pad, a keyboard, or a cursor control device, such as a mouse, or a joystick, touch screen display, remote control, or any other device operative to interact with the computer system 700.

The computer system 700 may also or alternatively include a disk or optical drive unit 706. The disk drive unit 706 may include a computer-readable medium 722 in which one or more sets of instructions 724, e.g. software, can be embedded. Further, the instructions 724 may embody one or more of the methods or logic as described herein. The instructions 724 may reside completely or partially within the memory 704 and/or within the processor 702 during execution by the computer system 700. The memory 704 and the processor 702 also may include computer-readable media as discussed above.

In some systems, a computer-readable medium 722 includes instructions 724 or receives and executes instructions 724 responsive to a propagated signal so that a device connected to a network 726 can communicate voice, video, audio, images, or any other data over the network 726. Further, the instructions 724 may be transmitted or received over the network 726 via a communication port or interface 720, and/or using a bus 708. The communication port or interface 720 may be a part of the processor 702 or may be a separate component. The communication port or interface 720 may be created in software or may be a physical connection in hardware. The communication port or interface 720 may be configured to connect with a network 726, external media, the display 710, or any other components in computer system 700, or combinations thereof. The connection with the network 726 may be a physical connection, such as a wired Ethernet connection or may be established wirelessly as discussed below. Likewise, the additional connections with other components of the computer system 700 may be physical connections or may be established wirelessly. The network 726 may alternatively be directly connected to the bus 708.

While the computer-readable medium 722 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 722 may be non-transitory, and may be tangible.

The computer-readable medium 722 can include a solid-state memory such as a memory card or other package that houses one or more non-volatile read-only memories. The computer-readable medium 722 can be a random-access memory or other volatile re-writable memory. Additionally or alternatively, the computer-readable medium 722 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 700 may be connected to one or more networks 726 (e.g., a network 106 in FIG. 1). The network 726 may define one or more networks including wired or wireless networks. The wireless network may be a cellular telephone network, an 802.11, 802.16, 802.20, or WiMax network. Further, such networks may include a public network, such as the Internet, a private network, such as an intranet, or combinations thereof, and may utilize a variety of networking protocols now available or later developed including, but not limited to TCP/IP based networking protocols. The network 726 may include wide area networks (WAN), such as the Internet, local area networks (LAN), campus area networks, metropolitan area networks, a direct connection such as through a Universal Serial Bus (USB) port, or any other networks that may allow for data communication. The network 726 may be configured to couple one computing device to another computing device to enable communication of data between the devices. The network 726 may generally be enabled to employ any form of machine-readable media for communicating information from one device to another. The network 726 may include communication methods by which information may travel between computing devices. The network 726 may be divided into sub-networks. The sub-networks may allow access to all of the other components connected thereto or the sub-networks may restrict access between the components. The network 726 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosed embodiments are not limited to any particular implementation or programming technique and that the disclosed embodiments may be implemented using any appropriate techniques for implementing the functionality described herein. The disclosed embodiments are not limited to any particular programming language or operating system.

It should be appreciated that in the above description of exemplary embodiments, various features of the present disclosure are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed embodiment requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment.

Furthermore, while some embodiments described herein include some but not other features included in other embodiments, combinations of features of different embodiments are meant to be within the scope of the present disclosure, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the disclosed techniques.

In the description provided herein, numerous specific details are set forth. However, it is understood that embodiments of the present disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments, those skilled in the art will recognize that other and further modifications may be made thereto without departing from the spirit of the present disclosure, and it is intended to claim all such changes and modifications as falling within the scope of the present disclosure. For example, any formulas given above are merely representative of procedures that may be used. Functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method for creating standalone objects, the method comprising:
    creating a dossier incorporating at least one dataset, the at least one dataset comprising one or more attributes and/or one or more metrics;
    creating a derived object using the at least one dataset, the derived object being one of: a derived attribute with a different data type than the one or more attributes, a derived attribute generated from a metric, or a derived metric generated from an attribute, wherein the derived attribute combines two or more attributes, creates one or more additional attributes, and/or performs mathematical or statistical functions on metrics, and wherein the derived metric is a result of a calculation on one or more metrics or is generated from an attribute;
    storing the derived object in memory, such that the derived object is a standalone object, independent of the dossier;
    utilizing the derived object to generate and provide analytics information to a user via a display;
    accessing the derived object at a second dossier different than the dossier;
    editing the derived object at the second dossier to generate an edited derived object; and
    storing the edited derived object in memory as a second dossier-specific derived object, such that the edited derived object is inaccessible by the dossier.

2. The computer-implemented method of claim 1, wherein the dossier is created based on a request by a creating user, the method further comprising sharing a copy of the dossier with a receiving user, wherein the creating user and the receiving user are different users.

3. The computer-implemented method of claim 2, the method further comprising editing the derived object to generate an edited derived object, and propagating the edited derived object to the copy of the dossier.

4. The computer-implemented method of claim 1, wherein the dossier is a first dossier, the method further comprising creating a second dossier incorporating the derived object.

5. The computer-implemented method of claim 4, the method further comprising editing the derived object to generate an edited derived object, wherein the edited derived object is propagated to the first dossier and the second dossier.

6. The computer-implemented method of claim 4, wherein the derived object is an original derived object, further comprising:
    editing the original derived object via the second dossier to form an edited derived object; and
    upon determining that a user creating the edited derived object lacks sufficient permissions, retaining the original derived object in the first dossier.

7. The computer-implemented method of claim 4, wherein the derived object is not editable via the second dossier.

8. The computer-implemented method of claim 1, further comprising implementing an access control list, wherein the access control list includes information regarding users who lack permission to edit the derived object.

9. A system comprising:
    one or more processors; and
    one or more computer readable media comprising instructions which, when executed by the one or more processors, cause the one or more processors to perform operations, the operations comprising:
        creating a dossier incorporating at least one dataset, the at least one dataset comprising one or more attributes and/or one or more metrics;
        creating a derived object using the at least one dataset, the derived object being one of: a derived attribute with a different data type than the one or more attributes, a derived attribute generated from a metric, or a derived metric generated from an attribute, wherein the derived attribute combines two or more attributes, creates one or more additional attributes, and/or performs mathematical or statistical functions on metrics, and wherein the derived metric is a result of a calculation on one or more metrics or is generated from an attribute;
        storing the derived object in memory, such that the derived object is a standalone object, independent of the dossier;
    utilizing the derived object to generate and provide analytics information to a user via a display;
    accessing the derived object at a second dossier different than the dossier;
    editing the derived object at the second dossier to generate an edited derived object; and
        storing the edited derived object in memory as a second dossier-specific derived object, such that the edited derived object is inaccessible by the dossier.

10. The system of claim 9, wherein the dossier is created based on a request by a creating user, the operations further comprising sharing a copy of the dossier with a receiving user, wherein the creating user and the receiving user are different users.

11. The system of claim 10, the operations further comprising editing the derived object to generate an edited derived object, and propagating the edited derived object to the copy of the dossier.

12. The system of claim 9, wherein the dossier is a first dossier, the operations further comprising creating a second dossier incorporating the derived object.

13. The system of claim 12, the operations further comprising editing the derived object to generate an edited derived object, wherein the edited derived object is propagated to the first dossier and the second dossier.

14. The system of claim 12, wherein the derived object is an original derived object, further comprising:
    editing the original derived object via the second dossier to form an edited derived object; and
    upon determining that a user creating the edited derived object lacks sufficient permissions, retaining the original derived object in the first dossier.

15. The system of claim 12, wherein the derived object is not editable via the second dossier.

16. The system of claim 9, further comprising implementing an access control list, wherein the access control list includes information regarding users who lack permission to edit the derived object.

17. A non-transitory machine-readable medium storing instructions that, when executed by a computing system, causes the computing system to perform a method for creating standalone objects, the method including:

creating a dossier incorporating at least one dataset, the at least one dataset comprising one or more attributes and/or one or more metrics;

creating a derived object using the at least one dataset, the derived object being one of: a derived attribute with a different data type than the one or more attributes, a derived attribute generated from a metric, or a derived metric generated from an attribute, wherein the derived attribute combines two or more attributes, creates one or more additional attributes, and/or performs mathematical or statistical functions on metrics, and wherein the derived metric is a result of a calculation on one or more metrics or is generated from an attribute;

storing the derived object in memory, such that the derived object is a standalone object, independent of the dossier; and utilizing the derived object to generate and provide analytics information to a user via a display;

accessing the derived object at a second dossier different than the dossier;

editing the derived object at the second dossier to generate an edited derived object; and storing the edited derived object in memory as a second dossier-specific derived object, such that the edited derived object is inaccessible by the dossier.

\* \* \* \* \*